(12) United States Patent
Azizi et al.

(10) Patent No.: US 11,928,529 B2
(45) Date of Patent: Mar. 12, 2024

(54) HIGH-THROUGHPUT BPF MAP MANIPULATIONS WITH UPROBES

(71) Applicant: New Relic, Inc., San Francisco, CA (US)

(72) Inventors: Omid Jalal Azizi, San Francisco, CA (US); John Peter Stevenson, San Francisco, CA (US); Yaxiong Zhao, San Francisco, CA (US)

(73) Assignee: NEW RELIC, INC., San Francisco, CA (US)

( * ) Notice: Subject to any disclaimer, the term of this patent is extended or adjusted under 35 U.S.C. 154(b) by 323 days.

(21) Appl. No.: 17/507,635

(22) Filed: Oct. 21, 2021

(65) Prior Publication Data
US 2023/0130274 A1   Apr. 27, 2023

(51) Int. Cl.
*G06F 9/54* (2006.01)
*G06F 21/54* (2013.01)

(52) U.S. Cl.
CPC .............. *G06F 9/545* (2013.01); *G06F 21/54* (2013.01)

(58) Field of Classification Search
CPC .................................. G06F 9/545; G06F 9/54
See application file for complete search history.

(56) References Cited

U.S. PATENT DOCUMENTS

| | | | |
|---|---|---|---|
| 10,747,875 B1* | 8/2020 | Stoler | H04L 9/3247 |
| 11,709,720 B1* | 7/2023 | Fournier | G06F 9/545 |
| | | | 719/318 |
| 2019/0140983 A1* | 5/2019 | Tu | H04L 69/22 |
| 2022/0147542 A1* | 5/2022 | Asgar | G06F 11/3089 |
| 2023/0104007 A1* | 4/2023 | Viswambharan | H04L 47/20 |
| | | | 370/235 |
| 2023/0168986 A1* | 6/2023 | Larkin | G06F 11/3072 |
| | | | 717/127 |
| 2023/0231830 A1* | 7/2023 | Shin | H04L 63/1408 |
| | | | 726/1 |

* cited by examiner

*Primary Examiner* — Hiep T Nguyen
(74) *Attorney, Agent, or Firm* — Goodwin Procter LLP

(57) ABSTRACT

High-throughput BPF map manipulations with uprobes are disclosed. A method for manipulating a Berkeley Packet Filter (BPF) map comprises running a user program in a user space of a computing environment. The user program includes a trigger function. A corresponding kernel BPF probe is installed by the user program on the trigger function. The kernel BPF probe is triggered by reaching a memory address of the trigger function in the user space. The trigger function includes one or more arguments that the BPF map agent interprets as operation parameters. The BPF map agent performs one or more operations to manipulate a BPF map in the kernel space based on the operation parameters.

20 Claims, 4 Drawing Sheets

HIGH-THROUGHPUT BPF MAP MANIPULATIONS WITH UPROBES

FIELD

The present disclosure is related to the field of Berkeley Packet Filters (BPF), and more particularly, to manipulating BPF maps within in computing environments.

BACKGROUND

Computing environments often include a user space where user processes are run (e.g., user programs) and a kernel space where system processes are run (e.g., device drivers, memory management, etc.). The user space and the kernel space are separated to protect the kernel from any malicious or errant software behavior that may occur in the user space. BPF technology can be used to provide "safe" access for users (or user programs) to the kernel space. For example, BPF programs can be configured by users to perform one or more functions within the kernel space. In some cases, BPF maps are used as shared memory structures that can be accessed from the user space and the kernel space. The computing environment can provide native system calls reading from and writing to the BPF maps, which can be used to transfer data between the user space and the kernel space. However, the time delay associated with performing BPF map operations on multiple elements (i.e., batch processing) can be significant.

SUMMARY

High-throughput BPF map manipulations with uprobes are disclosed. A method for manipulating a Berkeley Packet Filter (BPF) map comprises running a user program in a user space of a computing environment. The user program includes a trigger function. A corresponding kernel BPF probe is installed by the user program on the trigger function. The kernel BPF probe is triggered by reaching a memory address of the trigger function in the user space. The trigger function includes one or more arguments that the BPF map agent interprets as operation parameters. The BPF map agent performs one or more operations to manipulate a BPF map in the kernel space based on the operation parameters.

At least one aspect of the present disclosure is directed to a method for manipulating a Berkeley Packet Filter (BPF) map. The method includes running a user program in a user space of a computing environment, the user program including a trigger function corresponding to a kernel BPF probe, triggering the kernel BPF probe by reaching a memory address of the trigger function in the user space, providing, via the kernel BPF probe, one or more operation parameters to a BPF map agent in a kernel space of the computing environment, and performing, via the BPF map agent, one or more operations to manipulate a BPF map in the kernel space based on the one or more operation parameters.

In one embodiment, triggering the kernel BPF probe corresponds to a single transition from the user space to the kernel space. In some embodiments, performing the one or more operations to manipulate the BPF map includes reading from one or more locations of the BPF map and/or writing to one or more locations of the BPF map. In various embodiments, writing to one or more locations of the BPF map includes clearing the one or more locations of the BPF map. In certain embodiments, reading from one or more locations of the BPF map includes providing data values from the BPF map to a buffer accessible from the user space.

In some embodiments, the data values include values computed based on data values stored in the BPF map. In one embodiment, providing the one or more operation parameters to the BPF map agent includes providing a command parameter identifying the one or more operations to be performed by the BPF map agent, a pointer parameter identifying a memory location containing operation data for the one or more operations to be performed by the BPF map agent, and a size parameter identifying a size of the operation data in the memory location identified by the pointer parameter. In certain embodiments, the operation data for the one or more operations to be performed by the BPF map agent includes at least one of BPF map locations and data values for the one or more operations.

In one embodiment, the method includes determining the memory address of the trigger function and assigning the memory address of the trigger function to the kernel BPF probe in the user space. In some embodiments, the method includes interrupting the user program in the user space in response to triggering the kernel BPF probe and resuming the user program in the user space in response to a determination that the one or more operations to manipulate the BPF map have been completed.

Another aspect of the present disclosure is directed to a system including at least one memory storing computer-executable instructions, and at least one processor for executing the computer-executable instructions stored in the memory. The instructions, when executed, instruct the at least one processor to run a user program in a user space of a computing environment, the user program including a trigger function corresponding to a kernel Berkeley Packet Filter (BPF) probe, trigger the kernel BPF probe by reaching a memory address of the trigger function, provide, via the kernel BPF probe, one or more operation parameters to a BPF map agent in a kernel space of the computing environment, and perform, via the BPF map agent, one or more operations to manipulate a BPF map in the kernel space based on the one or more operation parameters.

In one embodiment, triggering the kernel BPF probe corresponds to a single transition from the user space to the kernel space. In some embodiments, performing the one or more operations to manipulate the BPF map includes reading from one or more locations of the BPF map and/or writing to one or more locations of the BPF map. In various embodiments, writing to one or more locations of the BPF map includes clearing the one or more locations of the BPF map. In certain embodiments, reading from one or more locations of the BPF map includes providing data values from the BPF map to a buffer accessible from the user space.

In some embodiments, reading from one or more locations of the BPF map includes providing data values from the BPF map to a buffer accessible from the user space. In one embodiment, the data values include values computed based on data values stored in the BPF map. In certain embodiments, providing the one or more operation parameters to the BPF map agent includes providing a command parameter identifying the one or more operations to be performed by the BPF map agent, a pointer parameter identifying a memory location containing operation data for the one or more operations to be performed by the BPF map agent, and a size parameter identifying a size of the operation data in the memory location identified by the pointer parameter. In various embodiments, operation data for the one or more operations to be performed by the BPF map agent includes at least one of BPF map locations and data values for the one or more operations.

In one embodiment, the instructions, when executed, instruct the at least one processor to interrupt the user program in the user space in response to triggering the kernel BPF probe and resume the user program in the user space in response to a determination that the one or more operations to manipulate the BPF map have been completed. In some embodiments, the user space corresponds to a first portion of the at least one memory and the kernel space corresponds to a second portion of the at least one memory.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

DETAILED DESCRIPTION

Disclosed herein are exemplary embodiments of systems and methods for providing Berkeley Packet Filter (BPF) map manipulations, and more specifically, systems and methods for providing high-throughput BPF map manipulations within computing environments.

Figure 1:
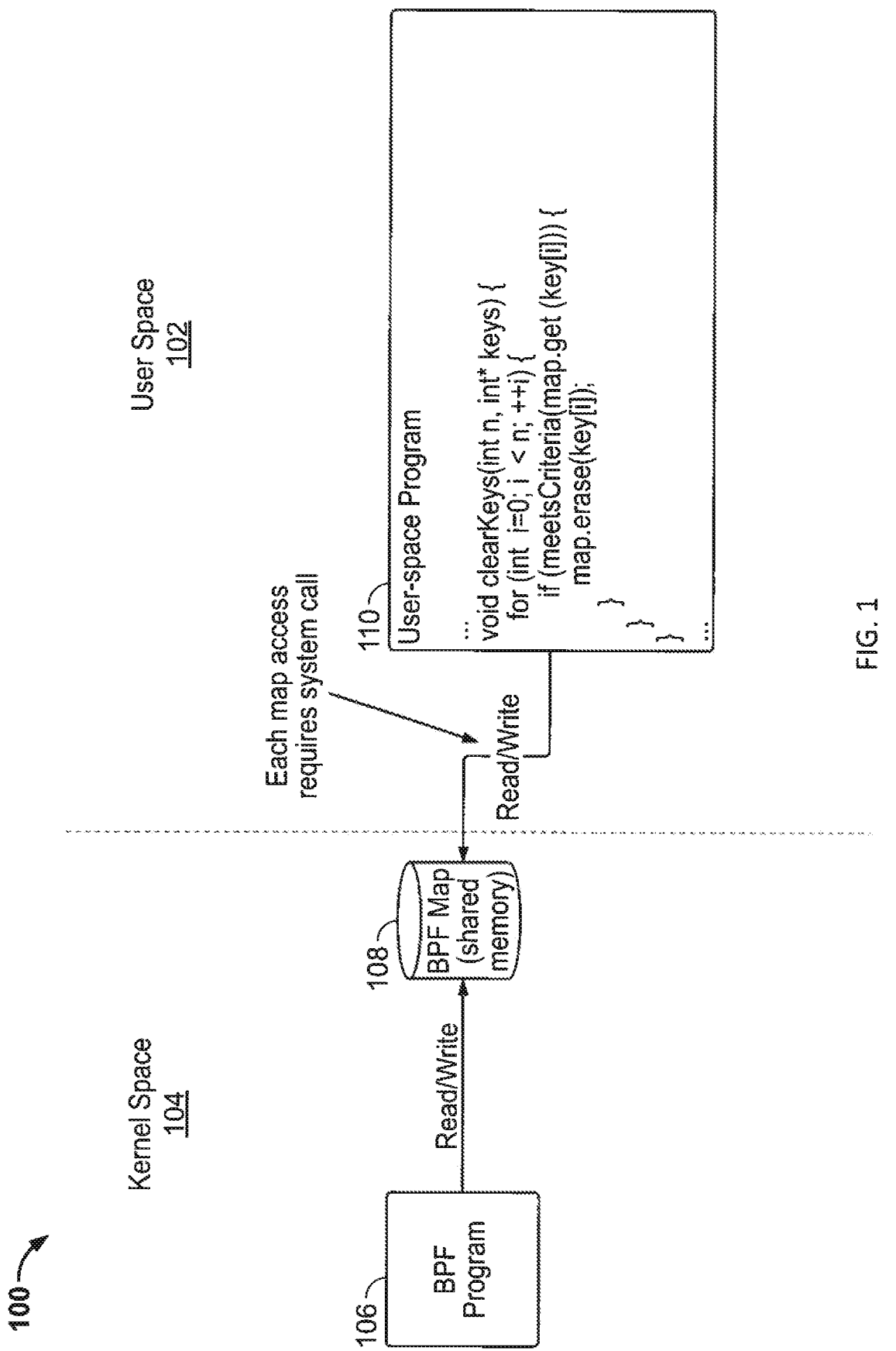
FIG. 1 is a functional block diagram of an example computing environment.

FIG. 1 is a functional block diagram of an example computing environment 100. In one example, the computing environment 100 corresponds to an operating system, such as a Linux operating system. As shown, the computing environment 100 includes a user space 102 and a kernel space 104. In some examples, the user space 102 is a set of memory locations where user processes are run (e.g., user programs) and the kernel space 104 is a set of memory locations where system processes are run (e.g., device drivers, memory management, etc.). The user space 102 and the kernel space 104 are separated to protect the kernel (i.e., system core) from any malicious or errant software behavior that may occur in the user space 102.

However, while the user space 102 is separated from the kernel space 104 to protect the kernel, in some cases, it may be necessary for the user (or user program) to have access to the kernel. For example, access to the kernel space 104 may be necessary to analyze network traffic or for other performance monitoring applications.

BPF technology can be used to provide "safe" access for users (or user programs) to the kernel space 104. As shown in FIG. 1, the kernel space 104 includes a BPF program 106. In one example, the BPF program 106 is a user developed program (or module) configured to perform one or more functions within the kernel space 104. As described above, the BPF program 106 can be configured to provide one or more functions associated with performance monitoring (e.g., network traffic analysis). The BPF program 106 may be developed in a user-friendly programming language before being compiled into machine language and deployed in the kernel space 104. In some examples, the Linux BPF architecture includes a BPF verifier configured to ensure the BPF program 106 is incapable of malicious or errant software behavior within the kernel space 104.

In Linux BPF architectures, BPF maps are used as global shared memory structures that can be accessed from the user space 102 and the kernel space 104. In some examples, the BPF map 108 is used to transfer data between the user space 102 and the kernel space 104. As shown in FIG. 1, the computing environment 100 includes a BPF map 108. The BPF map 108 can be accessed within the kernel space 104 by the BPF program 106.

In one example, the BPF map 108 can be accessed from the user space 102 via system calls that are native to the computing environment 100. For example, Linux operating systems include system calls that provide different BPF map operations (e.g., read, write, clear, etc.). In some examples, the native system calls may function similarly to an application programming interface (API) between the user space 102 and the BPF map 108. A user program 110 may be developed by the user and configured to call one or more of the BPF system calls from the user space 102.

While the user program 110 can be configured to call various system calls to perform BPF map operations, accessing or manipulating the BPF map 108 via system calls can be time consuming. For example, it takes a fixed amount of time for each system call to transfer from the user space 102 to the kernel space 104. This fixed amount of time can be viewed as a fixed cost associated with each system call. To perform BPF map operations on multiple elements of the BPF map 108, multiple system calls are required. In other words, clearing two elements (or locations) of the BPF map 108 requires at least two separate system calls, clearing three elements (or locations) of the BPF map 108 requires at least three separate system calls, and so on. The time delay associated with performing BPF map operations on multiple elements (i.e., batch processing) can be expensive in terms of the efficiency of the BPF program 106 and/or the user program 110. As such, it may be advantageous to reduce the number of transitions between the user space 102 and the kernel space 104 when performing BPF manipulations, particularly batch manipulations.

Figure 2:
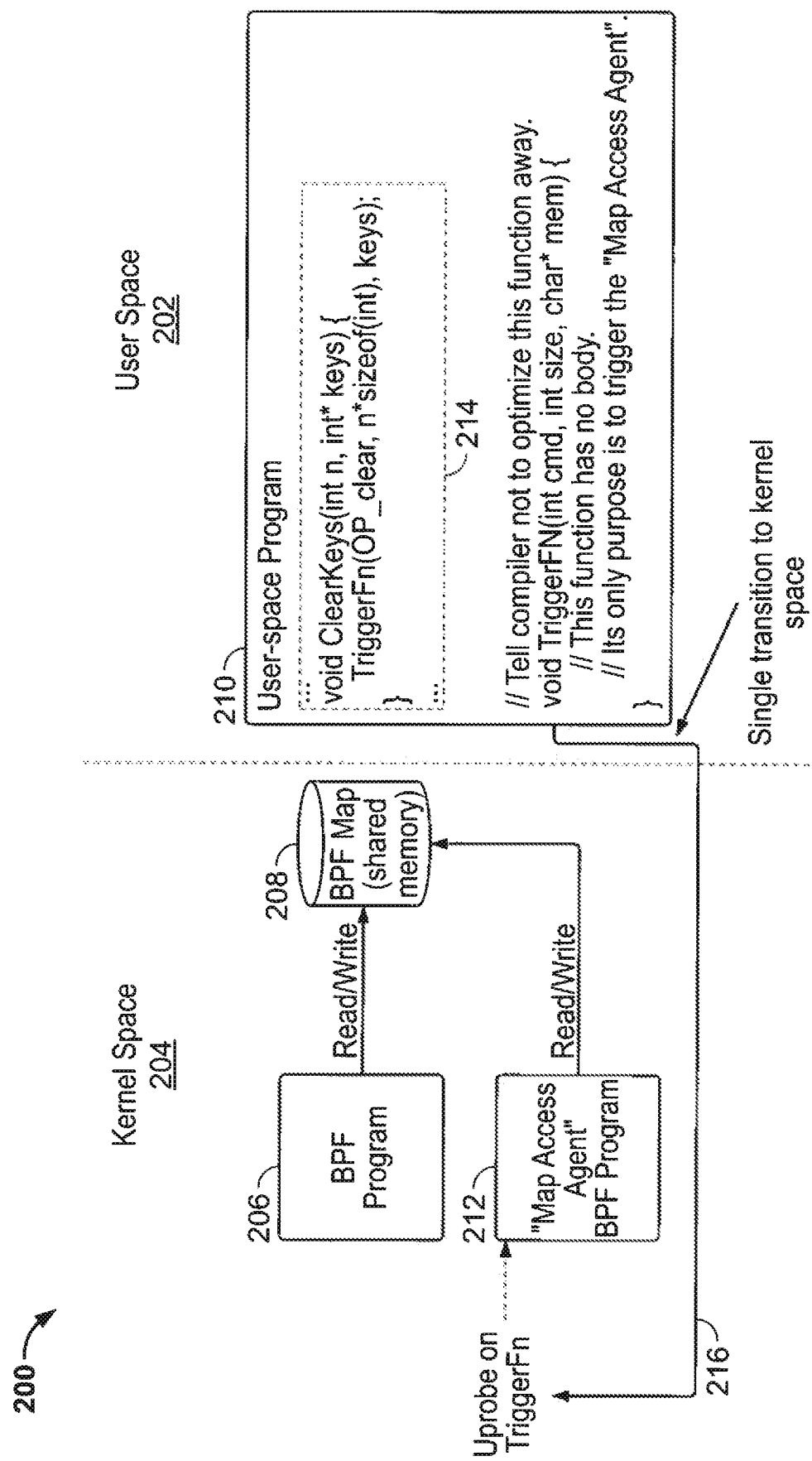
FIG. 2 is a functional block diagram of a computing environment in accordance with aspects described herein.

FIG. 2 is a functional block diagram of a computing environment 200 in accordance with aspects described herein. In one example, the computing environment 200 is substantially similar to the computing environment 100 of FIG. 1, except the computing environment 200 includes a BPF map agent 212. In some examples, the computing environment 200 is a Linux operating system. As shown, the computing environment 200 includes a user space 202 and a kernel space 204. The user space 202 includes a user program 210 corresponding to the user program 110 of FIG. 1. Likewise, the kernel space 204 includes a BPF program 206 corresponding to the BPF program 106 and a BPF map 208 corresponding to the BPF map 108 of FIG. 1, respectively.

In one example, the BPF map agent 212 is a user developed BPF program similar to the BPF program 206. The BPF map agent 212 can be configured to include a plurality of BPF map operations (e.g., read, write, clear, etc.) and is responsible for performing the desired actions (i.e., map manipulations) on behalf of the user space 202. In some examples, the map operations included to the BPF map agent 212 correspond to BPF instruction equivalents of the user space system calls discussed above.

The Linux BPF architecture supports the use of kernel BPF probes configured to interrupt the user space 102 in favor of BPF programs within the kernel space 204. In some examples, the kernel BPF probes can be configured to trigger based on various events (e.g., user functions, timers, kernel processes, etc.). As such, rather than using system calls like the user program 110 of FIG. 1, the user program 210 includes a trigger function 214 configured to trigger a kernel BPF probe 216 associated with the BPF map agent 212. In one example, the kernel BPF probe 216 is a BPF uprobe (i.e., user function probe). In certain examples, the configuration of the kernel BPF probe 216 is included in the user space 202 with the user program 210. In some examples, the configuration of the kernel BPF probe 216 is included within the user program 210 of the user space 202.

The trigger function 214 is configured to accept a plurality of arguments that determine the operations to be performed by the BPF map agent 212. In one example, the trigger function 214 includes a function header to accept the plurality arguments. For example, the trigger function 214 may have a function header configured to accept a command parameter, a pointer parameter, and a size parameter. The command parameter identifies the operation that the BPF map agent 212 should perform on behalf of the user space 202 (i.e., the user program 210). For example, the command parameter may indicate that the BPF map agent 212 is to perform a clearing operation. The pointer parameter identifies a raw memory location that contains information to be sent to the BPF map agent 212. For example, the pointer parameter may indicate the one or more keys to be cleared by the BPF map agent 212. The size parameter indicates the number of elements in the raw memory location identified by the pointer parameter. It should be appreciated that in other examples, the trigger function 214 can be configured to accept different types of arguments and/or a different number of arguments.

In some examples, the trigger function 214 is configured without a body and performs no action in the user space 202. As such, it may be necessary to instruct the complier of the user space 202 not to optimize away the trigger function 214. In other examples, the trigger function 214 may be configured to perform limited actions in the user space 202 (e.g., print statements).

In one example, the memory address (or location) of the trigger function 214 is used to link the trigger function 214 to the BPF map agent 212. For example, the memory address of the trigger function 214 can be included in the configuration of the kernel BPF probe 216 such that the BPF map agent 212 is triggered whenever the memory address is reached. In some examples, the memory address of the trigger function 214 may be retrieved via one or more functions included in the user program 210 (or the user space 202); however, in other examples, the memory address may be retrieved using a different method or may be assigned to a known memory location.

When the trigger function 214 is called by the user program 214, the user space 202 is interrupted and the BPF map agent 212 is triggered by the kernel BPF probe 216 to perform one or more BPF map operations. As described above, the one or more BPF map operations are defined by the arguments passed to BPF map agent 212 from the function header of the trigger function 214. In some examples, the BPF map agent 212 is configured to inspect (or verify) the arguments passed from the trigger function 214 before performing the one or more BPF map operations. As such, the one or more BPF map operations can be performed with only a single transition from the user space 202 to the kernel space 204 (i.e., the triggering of the kernel BPF probe 216).

Given that only a single transition between the user space 202 and the kernel space 204 is needed to perform one or more BPF map operations, the runtime of the BPF map operations can be reduced. For example, due to the single transition between the user space 202 and the kernel space 204, the runtime of high-throughput (i.e., batch) BPF operations can be reduced significantly relative to prior approaches (e.g., iterative system calls). Table 1 below illustrates several example BPF map operation scenarios:

TABLE 1

Example BPF map operation scenarios.

| Scenario | Prior Method | Improved Method | Speed Improvement |
| --- | --- | --- | --- |
| Remove a list of 100 specified keys | 81.7 us | 17.0 us | 4.8x |
| Conditionally remove a list of 100 specified keys | 125.4 us | 15.6 us | 8x |

In one example, the prior method in Table 1 corresponds to the iterative system call approach described above with respect to the computing environment 100 of FIG. 1. Likewise, the improved method in Table 1 corresponds to the computing environment 200 of FIG. 2 including the BPF map agent 212 and the trigger function 214. As shown, when using the improved method provided herein, the runtime associated with removing a list of 100 specified keys from the BPF map 208 may be up to 4.8 times faster than the corresponding runtime of the prior method. Similarly, when using the improved method, the runtime associated with conditionally removing a list of 100 specified keys from the BPF map 208 may be up to 8 times faster than the corresponding runtime of the prior method.

While the above examples describe a single instance of the trigger function 214, it should be appreciated that multiple instances of the trigger function 214 can be included in the user program 210. For example, a first instance of the trigger function 214 may be used to instruct the BPF map agent 212 to write data to a first set of locations in the BPF map 208 and a second instance of the trigger function 214 may be used to instruct the BPF map agent 212 to read data from a second set of locations in the BPF map 208.

Figure 3:
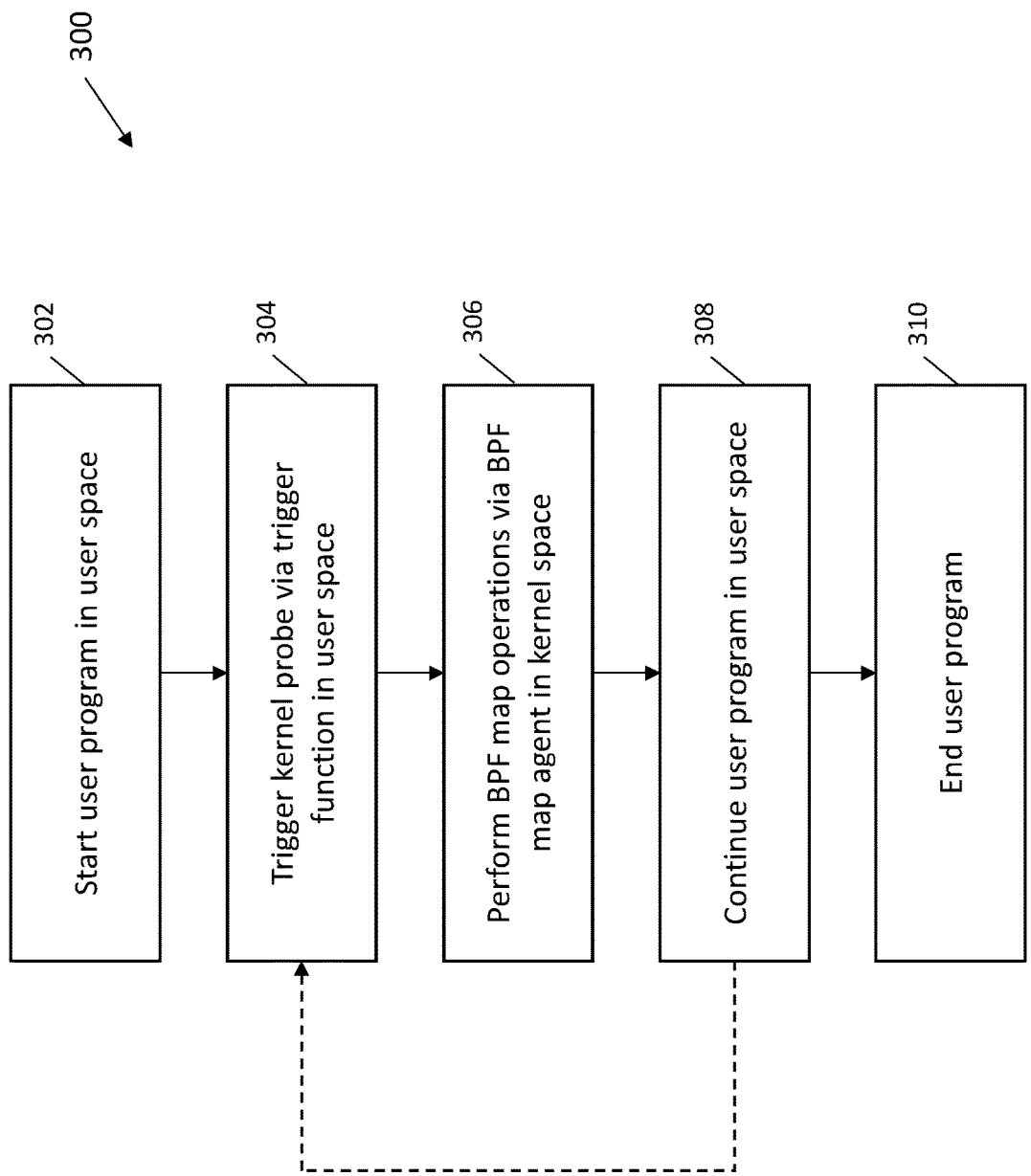
FIG. 3 is a flow diagram of a method for operating a computing environment configured for high-throughput BPF map manipulations in accordance with aspects described herein.

FIG. 3 is a flow diagram of a method 300 for operating a computing environment configured for high-throughput BPF map manipulations in accordance with aspects described herein. In one example, the method 300 corresponds to the operation of the computing environment 200 of FIG. 2. In some examples, at least a portion of the method 300 is configured to be carried out by a processor, a controller, or a computing system (e.g., the computer system 400 of FIG. 4).

At step 302, the user program 210 is started in the user space 202 of the computing environment 200. As described above, the computing environment 200 includes the user space 202 and the kernel space 204. The user space 202 includes the user program 210 having the trigger function 214 and the kernel space 204 includes the BPF program 206, the BPF map 208, and the BPF map agent 212. In some examples, the user program 210 is configured to perform one or more functions within the user space 202.

At step 304, the kernel BPF probe 216 is triggered via a first instance of the trigger function 214 in the user program 210. In one example, the kernel BPF probe 216 is triggered whenever the instruction address of the trigger function 214 is reached. In some examples, the configuration of the kernel BPF probe 216 is included within the user program 210.

At step 306, in response to triggering the kernel BPF probe 216, the BPF map agent 212 performs one or more BPF map operations specified by the first instance of the trigger function 214. As described above, the trigger function 214 includes a function header that accepts parameters defining the one or more BPF map operations to be performed by the BPF map agent 212. For example, the function header may include a command parameter, a pointer parameter, and a size parameter. In one example, the command parameter identifies the operation to be performed by the BPF map agent 212 (e.g., read, write, clear, etc.), the pointer parameter identifies a raw memory location that contains information or data for the BPF map agent 212 to perform the operation (e.g., keys to read, data to write, etc.), and the size parameter identifies the number of elements in the raw memory location identified by the pointer parameter. In some examples, triggering the kernel BPF probe 216 interrupts the user space program 210 and/or the user space 202 while the BPF map agent 212 is performing the one or more BPF map operations.

At step 308, in response to the BPF map agent 212 completing the one or more BPF map operations, the user program 210 continues to run. If there are additional instances of the trigger function 214 (e.g., second, third, etc.), the method 300 returns to step 304 each time the instruction address of the additional instances are reached. Otherwise, the user program 210 continues to run until ending at step 310.

In certain examples, the kernel space 204 may have an instruction count limit. As such, the operation count of the BPF map agent 212 may be limited to a specific number of operations (e.g., 100 operations or less). However, BPF tail calls can be used to extend or circumvent the instruction count limit. In other words, the BPF map agent 212 can be configured to call follow-up functions to perform additional operations.

In one example, the BPF map agent 212 can be configured to provide a high-efficiency read operation by transferring data from the BPF map 208 to a "perf buffer." The perf buffer is a data buffer that can be accessed from the user space 202 (e.g., by the user program 210) with a higher throughput than reading directly from the BPF map 208. In some examples, parameters of the perf buffer (e.g., size) may be controlled or adjusted from the user space 202. The BPF map agent 212 may provide data values read from the BPF map 208 and/or values computed based on the data values stored in the BPF map 208. In some examples, the computed values may be determined by the BPF map agent 212 or a BPF program.

Figure 4:
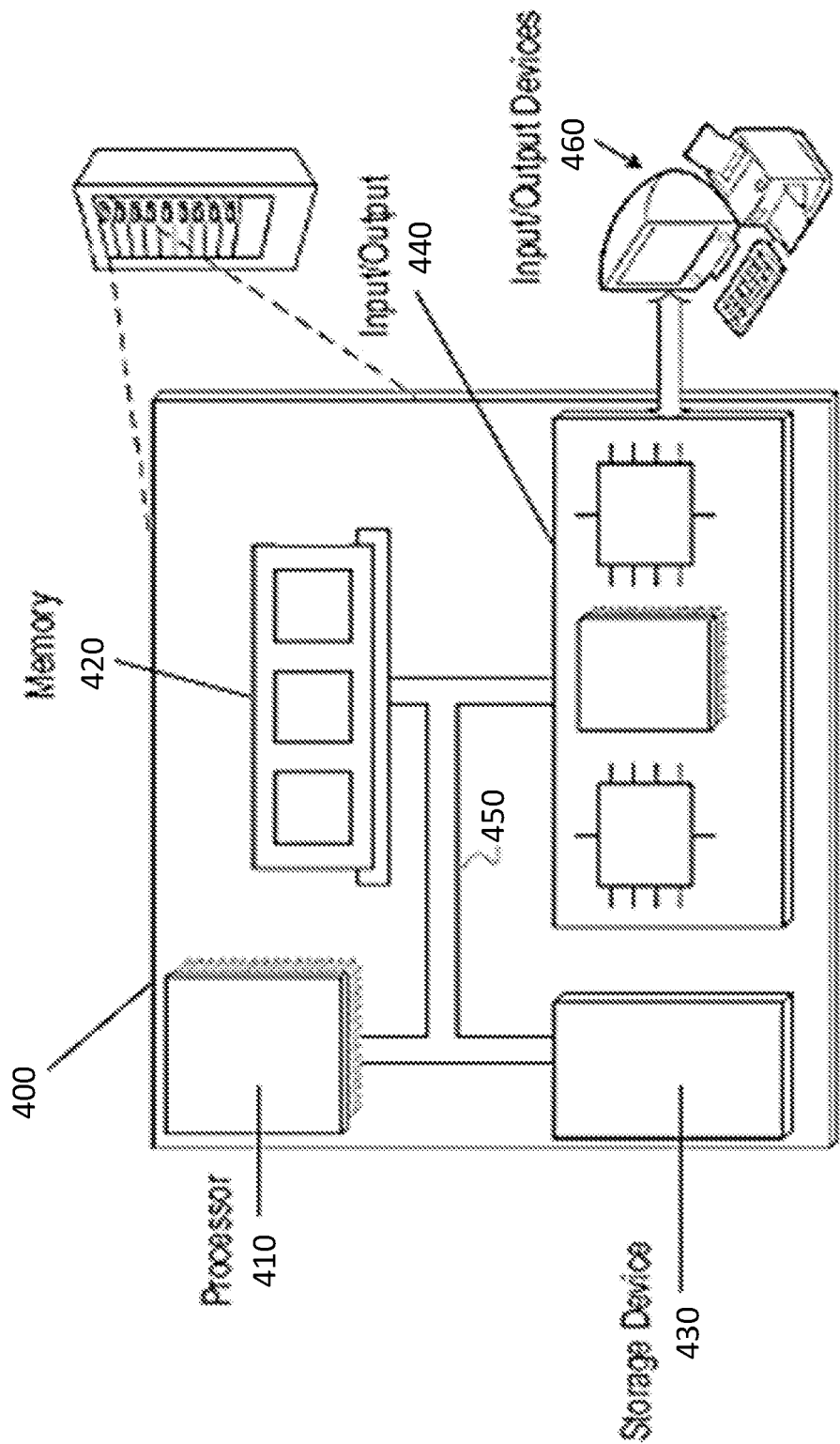
FIG. 4 is a block diagram of an example computer system in accordance with aspects described herein.

FIG. 4 is a block diagram of an example computer system 400 that may be used in implementing the systems and methods described herein. General-purpose computers, network appliances, mobile devices, or other electronic systems may also include at least portions of the system 400. The system 400 includes a processor 410, a memory 420, a storage device 430, and an input/output device 440. Each of the components 410, 420, 430, and 440 may be interconnected, for example, using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430.

The memory 420 stores information within the system 400. In some implementations, the memory 420 is a non-transitory computer-readable medium. In some implementations, the memory 420 is a volatile memory unit. In some implementations, the memory 420 is a nonvolatile memory unit. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

The storage device 430 is capable of providing mass storage for the system 400. In some implementations, the storage device 430 is a non-transitory computer-readable medium. In various different implementations, the storage device 430 may include, for example, a hard disk device, an optical disk device, a solid-date drive, a flash drive, or some other large capacity storage device. For example, the storage device may store long-term data (e.g., database data, file system data, etc.). The input/output device 440 provides input/output operations for the system 400. In some implementations, the input/output device 440 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 460. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 430 may be implemented in a distributed way over a network, such as a server farm or a set of widely distributed servers, or may be implemented in a single computing device.

Although an example processing system has been described in FIG. 4, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

As described above, improved systems and methods for providing high-throughput BPF map manipulations are provided herein. In at least one embodiment, a BPF map agent is triggered from the user space of a computing environment to provide BPF map manipulations. In some examples, the BPF map agent is triggered via a kernel BPF probe to reduce the number of transitions between user space and kernel space when performing batch BPF map manipulations.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated from the described processes. Accordingly, other implementations are within the scope of the following claims.

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for manipulating a Berkeley Packet Filter (BPF) map, the method comprising:
running a user program in a user space of a computing environment, the user program including a trigger function corresponding to a kernel BPF probe;
triggering the kernel BPF probe by reaching a memory address of the trigger function in the user space;
providing, via the kernel BPF probe, one or more operation parameters to a BPF map agent in a kernel space of the computing environment; and
performing, via the BPF map agent, one or more operations to manipulate a BPF map in the kernel space based on the one or more operation parameters.

2. The method of claim 1, wherein triggering the kernel BPF probe corresponds to a single transition from the user space to the kernel space.

3. The method of claim 1, wherein performing the one or more operations to manipulate the BPF map includes reading from one or more locations of the BPF map and/or writing to one or more locations of the BPF map.

4. The method of claim 3, wherein writing to one or more locations of the BPF map includes clearing the one or more locations of the BPF map.

5. The method of claim 3, wherein reading from one or more locations of the BPF map includes providing data values from the BPF map to a buffer accessible from the user space.

6. The method of claim 5, wherein the data values include values computed based on data values stored in the BPF map.

7. The method of claim 1, wherein providing the one or more operation parameters to the BPF map agent includes providing a command parameter identifying the one or more operations to be performed by the BPF map agent, a pointer parameter identifying a memory location containing operation data for the one or more operations to be performed by the BPF map agent, and a size parameter identifying a size of the operation data in the memory location identified by the pointer parameter.

8. The method of claim 7, wherein the operation data for the one or more operations to be performed by the BPF map agent includes at least one of BPF map locations and data values for the one or more operations.

9. The method of claim 1, further comprising:
   determining the memory address of the trigger function; and
   assigning the memory address of the trigger function to the kernel BPF probe in the user space.

10. The method of claim 1, further comprising:
    interrupting the user program in the user space in response to triggering the kernel BPF probe; and
    resuming the user program in the user space in response to a determination that the one or more operations to manipulate the BPF map have been completed.

11. A system comprising:
    at least one memory storing computer-executable instructions; and
    at least one processor for executing the computer-executable instructions stored in the memory, wherein the instructions, when executed, instruct the at least one processor to:
      run a user program in a user space of a computing environment, the user program including a trigger function corresponding to a kernel Berkeley Packet Filter (BPF) probe;
      trigger the kernel BPF probe by reaching a memory address of the trigger function;
      provide, via the kernel BPF probe, one or more operation parameters to a BPF map agent in a kernel space of the computing environment; and
      perform, via the BPF map agent, one or more operations to manipulate a BPF map in the kernel space based on the one or more operation parameters.

12. The system of claim 11, wherein triggering the kernel BPF probe corresponds to a single transition from the user space to the kernel space.

13. The system of claim 11, wherein performing the one or more operations to manipulate the BPF map includes reading from one or more locations of the BPF map and/or writing to one or more locations of the BPF map.

14. The system of claim 13, wherein writing to one or more locations of the BPF map includes clearing the one or more locations of the BPF map.

15. The system of claim 13, wherein reading from one or more locations of the BPF map includes providing data values from the BPF map to a buffer accessible from the user space.

16. The system of claim 15, wherein the data values include values computed based on data values stored in the BPF map.

17. The system of claim 11, wherein providing the one or more operation parameters to the BPF map agent includes providing a command parameter identifying the one or more operations to be performed by the BPF map agent, a pointer parameter identifying a memory location containing operation data for the one or more operations to be performed by the BPF map agent, and a size parameter identifying a size of the operation data in the memory location identified by the pointer parameter.

18. The system of claim 17, wherein the operation data for the one or more operations to be performed by the BPF map agent includes at least one of BPF map locations and data values for the one or more operations.

19. The system of claim 11, wherein the instructions, when executed, further instruct the at least one processor to:
    interrupt the user program in the user space in response to triggering the kernel BPF probe; and
    resume the user program in the user space in response to a determination that the one or more operations to manipulate the BPF map have been completed.

20. The system of claim 11, wherein the user space corresponds to a first portion of the at least one memory and the kernel space corresponds to a second portion of the at least one memory.

* * * * *